United States Patent Office 2,837,545
Patented June 3, 1958

2,837,545

9α,11β,16α,17α,21-PENTA-HYDROXY-4-PREGNENE-3,20 DIONE, ITS 16,21 DIESTERS AND PROCESS OF PREPARING THE ABOVE COMPOUNDS

Seymour Bernstein, Pearl River, N. Y., and Robert H. Lenhard, Ridgefield Park, N. J., assignors to American Cyanamid Company, New York, N. Y., a corporation of Maine No Drawing. Application April 29, 1957
Serial No. 655,490

7 Claims. (Cl. 260—397.45)

This invention relates to new 9α-hydroxy-4-pregnenes and methods of preparing the same.

It is known that 9-halo-hydrocortisones are more active than hydrocortisone. However, the 9-halo-hydrocortisones have such high electrolyte activity that they can be used only topically and not systematically. We have now found that 9α,16α-dihydroxyhydrocortisone or cortisone and esters thereof are highly active without the undesirable sodium retention effect.

The new compounds of the present invention may be illustrated by the following general formula:

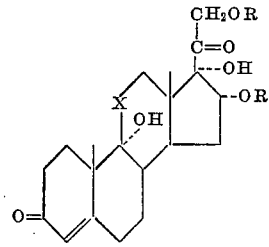

in which R is hydrogen or a lower alkanoyl radical and X is the divalent radical

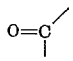

or

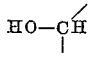

The compounds of the present invention are relatively high melting crystalline solids. They are soluble in the common organic solvents.

The present compounds are prepared from the 9β,11β-oxide of 4-pregnenes described and claimed in our United States Patent No. 2,773,058, which issued December 4, 1956. These latter compounds are reacted with an agent, such as perchloric acid, in water and/or a water miscible solvent. The reaction is usually carried out at about room temperature, although it can be carried out at a temperature within the range of 5° to 50° C. The reaction is usually complete in a matter of one hour to 72 hours within the above temperature range. Following completion of the reaction, the mixture is neutralized with mild alkali, and the desired product is extracted with a solvent such as ethyl acetate. The solvent is removed by evaporation, and the product can be purified by partition chromatography and recrystallization from solvents such as acetone, petroleum ether, alcohols, or mixtures thereof.

The compounds of the present invention are active as anti-inflammatory agents in the treatment of arthritis, burns, and atopic dermatitis. They can be dispensed in the form of capsules, pills, tablets, solutions for injection, ointments, salves, and the like.

The following examples describe in detail the preparation of 9α-hydroxy-4-pregnenes.

Example 1

The 16α,21 - diacetoxy - 9β,11β - oxido-17α-hydroxy-4-pregnene-3,20-dione (0.80 g.) in dioxane (8 ml.) and water (1.6 ml.) was treated with 3 N perchloric acid (3 ml.). After standing at 22° C. for five hours, the deep yellow solution was diluted with water and neutralized with sodium bicarbonate. It was then extracted with ethyl acetate, and the extract was washed with saturated saline, dried, and evaporated to a pale yellow glass. The residue was dissolved in 10 ml. of pyridine, treated with 5 ml. of acetic anhydride, and allowed to stand at room temperature overnight. Methanol and benzene were added, and the solution was evaporated to dryness (wt. 0.82 g.). A solvent system consisting of 3 parts (by vol.) of ethyl acetate, 2 parts of petroleum ether (90°–100° C.), 3 parts of methanol, and 2 parts of water was prepared. The residue was shaken with 15 ml. of the lower (stationary) phase and 30 ml. of the upper (mobile) phase. The crystalline solid which did not dissolve was removed by filtration and washed with 15 ml. of the mobile phase to afford 460 mg. of chromatographically pure product, 174.5°–238.5° C. with previous softening (solvated). $\lambda_{max}$ 242 m$\mu$ ($\epsilon$16,100); $\nu_{max}$ 3480, 1742, 1658, 1625 (inflection), and 1240 cm.$^{-1}$; $[\alpha]_D^{25}$ +95° (C, 0.591; $\alpha_D$ +0.56°) (CHCl$_3$).

Anal.—Calc'd. for $C_{25}H_{34}O_9$ (478.52):C, 62.75; H, 7.16. Found: C, 62.92; H, 7.33.

Example 2

A cold solution of the pentol diacetate prepared in Example 1 (150 mg.) in pyridine (5 ml.) was added to a slurry of chromic anhydride (113 mg.) and cold pyridine (2 ml.). After standing at 18°–24° C. for 17 hours, the reaction mixture was shaken for one hour with a solution of sodium sulfite (0.34 g.) in water (4 ml.) and then poured into ice water. The solution was extracted several times with ethyl acetate, and the extract was washed with saturated saline solution, dried, and evaporated to a white crystalline solid. Crystallization of the residue from acetone-petroleum ether gave 136 mg. of 16α,21-diacetoxy-9α,17α-dihydroxy-4-pregnene-3,11,21-trione, Two recrystallizations from acetone-petroleum ether afforded 128 mg. of product, melting point 255.5°–257.5° C. with previous softening; $\lambda_{max}$ 237 m$\mu$ ($\epsilon$14,200); $\nu_{max}$ 3430, 1750, 1732, 1656, and 1632 cm.$^{-1}$ (inflection); $[\alpha]_D^{25}$ +122° (C, 0.335ffi $\alpha_D$ +0.82°) (CHCl$_3$).

Anal.—Calc'd for $C_{25}H_{32}O_9$ (476.51): C, 63.01; H, 6.77. Found: C, 63.35; H, 7.11.

Example 3

A solution of 150 mg. of 16α,21-diacetoxy-9α,11β,17α-trihydroxy-4-pregnene-3,20-dione, prepared in Example 1, in approximately 100 ml. of methanol was treated with 14.5 mg. of sodium in 6 ml. of methanol. Dry nitrogen was bubbled through the reaction mixture, and after ten minutes at room temperature, the reaction was stopped by the addition of 0.06 ml. of glacial acetic acid. The solution was then evaporated under reduced pressure to a white solid. (A small portion was tested for water solubility and found to be fairly soluble as evidenced by a strong positive Blue Tetrazolium test on the supernatant liquid). The organic residue was dissolved in acetone, and the insoluble sodium acetate was removed by filtration. Concentration of the filtrate afforded 71 mg. of the crude pentol, melting point 247.5°–251° C., with decomposition and previous softening. Three recrystallizations from acetone (petroleum ether wash) gave 37 mg. of pure 9α,11β,16α,17α,21-penta-hydroxy-4-pregene-3,20-dione, melting point 259°–261.5° C. with decomposition and previous softening; $\lambda_{max}$ 241–242 m$\mu$ ($\epsilon$14,300); $\nu_{max}$ 3400, 1718, 1660, and 1635 mμ (inflection); $[\alpha]_D^{25}$ +113° (C, 0.784; $\alpha_D$ +0.89°) (pyridine).

*Anal.*—Calc'd for $C_{21}H_{30}O_7$ (394.45): C, 63.94; H, 7.66. Found: C, 64.01; H, 7.74.

We claim:

1. Compounds having the general formula:

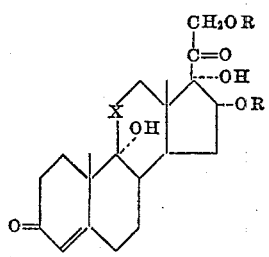

in which R is a member of the group consisting of hydrogen and lower alkanoyl radicals and X is a divalent radical of the group consisting of

and

radicals.

2. The compound 16α,21-diacetoxy-9α,11β,17α-trihydroxy-4-pregnene-3,20-dione.

3. The compound 16α,21-diacetoxy-9α,17α-dihydroxy-4-pregnene-3,11,20-trione.

4. The compound 9α,11β,16α,17α,21-penta-hydroxy-4-pregnene-3,20-dione.

5. A method of preparing 16α,21-di-lower alkanoyloxy-9α,11β,17α-trihydroxy-4-pregnene-3,20-dione which comprises reacting 16α,21-di-lower alkanoyloxy-9β,11β-oxido-17α-hydroxy-4-pregnene-3,20-dione with perchloric acid in a mixture of water and a water-miscible solvent.

6. A method of preparing 16α,21-diacetoxy-9α,11β,17α-trihydroxy-4-pregnene-3,20-dione which comprises reacting 16α,21-diacetoxy-9β,11β-oxido-17α-hydroxy-4-pregnene-3,20-dione with perchloric acid in a mixture of water and a water miscible solvent.

7. A method of preparing 9α,11β,16α,17α,21-penta-hydroxy-4-pregnene-3,20-dione which comprises reacting 16α,21-diacetoxy-9β,11β-oxido-17α-hydroxy-4-pregnene-3,20-dione with perchloric acid in a mixture of water and a water miscible solvent and subsequently with methanol and sodium metal.

References Cited in the file of this patent

UNITED STATES PATENTS

| 2,752,365 | Marlatt | June 26, 1956 |
| 2,773,058 | Bernstein | Dec. 4, 1956 |